United States Patent
Kang et al.

(10) Patent No.: US 10,191,511 B2
(45) Date of Patent: Jan. 29, 2019

(54) CONVERTIBLE DEVICE AND METHOD OF CONTROLLING OPERATION BASED ON ANGLE DATA

(71) Applicant: LG ELECTRONICS INC., Seoul (KR)

(72) Inventors: Sungsuk Kang, Seoul (KR); Ilgeun Kwon, Seoul (KR); Chul Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 975 days.

(21) Appl. No.: 14/587,061

(22) Filed: Dec. 31, 2014

(65) Prior Publication Data

US 2015/0192954 A1    Jul. 9, 2015

(30) Foreign Application Priority Data

Jan. 3, 2014   (KR) .................. 10-2014-0000645

(51) Int. Cl.
*G06F 1/16* (2006.01)
*G06F 1/32* (2006.01)
(Continued)

(52) U.S. Cl.
CPC ............ *G06F 1/1624* (2013.01); *G06F 1/162* (2013.01); *G06F 1/1616* (2013.01);
(Continued)

(58) Field of Classification Search
CPC ...... G06F 1/1624; G06F 1/1616; G06F 1/162; G06F 1/1637; G06F 1/1677;
(Continued)

(56) References Cited

U.S. PATENT DOCUMENTS

2006/0203014 A1* 9/2006 Lev .................. G06F 1/162
                                                345/659
2009/0322790 A1    12/2009 Behar et al.
(Continued)

FOREIGN PATENT DOCUMENTS

CN    101320282 A    12/2008
CN    102037425 A1    4/2011
(Continued)

*Primary Examiner* — Ji H Bae
(74) *Attorney, Agent, or Firm* — Birch, Stewart, Kolasch & Birch, LLP

(57) ABSTRACT

A convertible device and a method of controlling therefor are disclosed in the present specification. In this case, according to one embodiment, a convertible device includes at least one of the first processing module and the second processing module that comprises a memory configured to store mode information for a plurality of operational modes of the convertible device, and to store first angle data, a receiving unit configured to receive an input for changing an angle different from an angle of the stored first angle data, a detection unit configured to detect second angle data according to the received input, a controller configured to identify an operational mode of the convertible device based on the first and second angle data and the stored mode information, and control to output a predetermined user interface on the identified operational mode of the convertible device, and an output unit configured to output a predetermined user interface.

20 Claims, 14 Drawing Sheets

FIG. 14

(51) Int. Cl.
*G06F 3/048* (2013.01)
*G06F 9/451* (2018.01)
*G06F 9/4401* (2018.01)

(52) U.S. Cl.
CPC .......... *G06F 1/1637* (2013.01); *G06F 1/1677* (2013.01); *G06F 1/3206* (2013.01); *G06F 1/3265* (2013.01); *G06F 3/048* (2013.01); *G06F 9/441* (2013.01); *G06F 9/451* (2018.02); *Y02D 10/153* (2018.01)

(58) Field of Classification Search
CPC ...... G06F 1/3206; G06F 1/3265; G06F 3/048; G06F 9/441; G06F 9/4443; Y02B 60/1242
USPC ....................................................... 713/100
See application file for complete search history.

(56) References Cited

U.S. PATENT DOCUMENTS

| | | | |
|---|---|---|---|
| 2011/0179864 A1 | 7/2011 | Raasch et al. | |
| 2012/0288139 A1 | 11/2012 | Singhar | |
| 2013/0135352 A1 | 5/2013 | Matsuda et al. | |
| 2013/0151840 A1* | 6/2013 | Kanigicherla | G06F 9/461 713/100 |
| 2014/0002978 A1 | 1/2014 | Ding | |
| 2014/0043259 A1* | 2/2014 | Park | G06F 3/0412 345/173 |
| 2014/0122912 A1* | 5/2014 | Andou | G06F 1/3265 713/324 |
| 2015/0052375 A1* | 2/2015 | Deng | G06F 1/3234 713/323 |
| 2015/0074598 A1* | 3/2015 | Yao | G06F 3/0488 715/803 |
| 2015/0116364 A1* | 4/2015 | Aurongzeb | G06F 3/0487 345/659 |
| 2015/0130725 A1* | 5/2015 | Knepper | G06F 1/1643 345/173 |
| 2016/0196146 A1* | 7/2016 | Wilson | G06F 9/441 713/1 |
| 2016/0274722 A1* | 9/2016 | Putzolu | G06F 1/1616 |

FOREIGN PATENT DOCUMENTS

| | | |
|---|---|---|
| CN | 102279770 A | 12/2011 |
| CN | 103257877 A | 8/2013 |
| CN | 103425197 A | 12/2013 |
| WO | WO 03/081404 A2 | 10/2003 |
| WO | WO 2013/048443 A1 | 4/2013 |
| WO | WO 2013/114820 A1 | 8/2013 |

* cited by examiner (a)

(b)

(a)                (b)

(c)                (d)

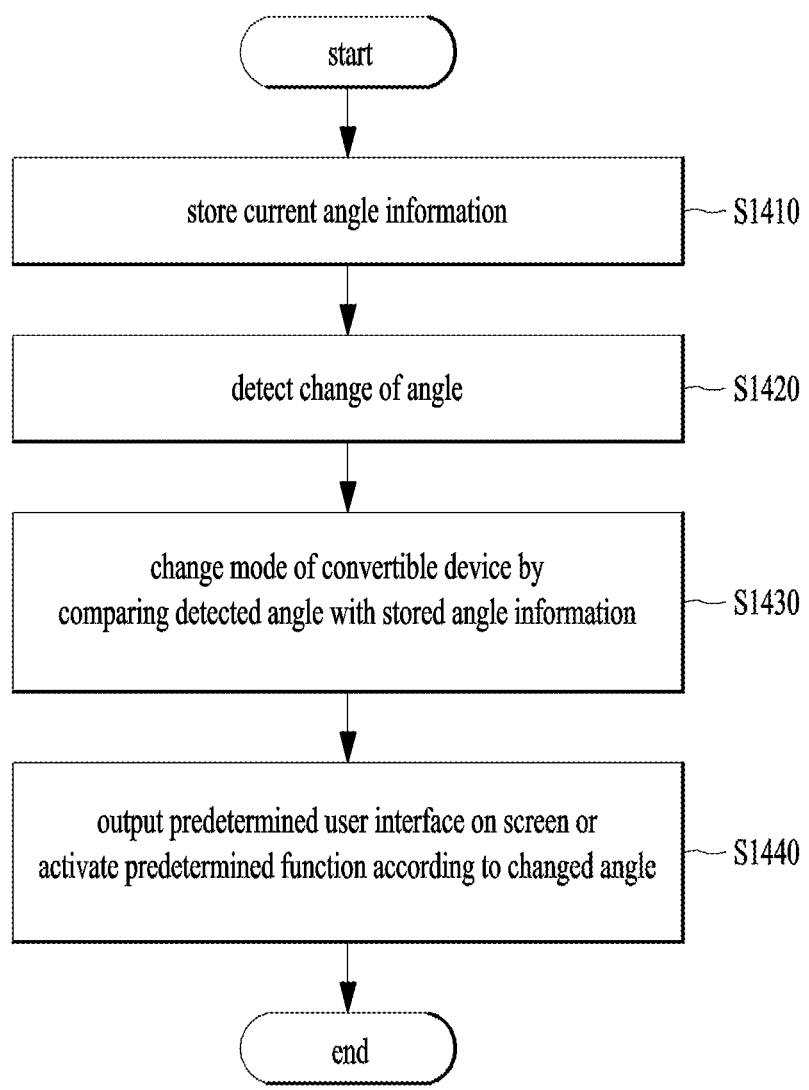

CONVERTIBLE DEVICE AND METHOD OF CONTROLLING OPERATION BASED ON ANGLE DATA

This application claims the benefit of the Korean Patent Application No. 10-2014-0000645, filed on Jan. 3, 2014, which is hereby incorporated by reference as if fully set forth herein.

BACKGROUND OF THE INVENTION

Field of the Invention

The present invention relates to a convertible device and a method of controlling therefor.

Discussion of the Related Art

As a full-scale digital service starts, digital convergence is vitalizing. Hence, a digital device is supplied to a market in a manner of being implemented in various forms. For instance, conventionally, such a fixed device as a TV, a PC and the like used to be a main model of the digital device. Yet, recently, a mobile device emphasizing on portability becomes a general trend with the help of development of a semiconductor technology.

In particular, a smartphone, a wearable device, a tablet PC and the like are forming main stream of the mobile device. Meanwhile, since a legacy mobile communication terminal was focusing on such a simple function as making a call or transceiving a text message, a size of a display screen was not an important issue. Yet, as a trend is changing from the legacy mobile communication terminal to a smartphone, functions including not only the aforementioned simple functions but also web browsing or surfing, application execution and the like, which used to be implemented by a legacy PC only, can be implemented by a smartphone as well. Hence, a size and/or a resolution of a display screen are/is becoming a sensitive issue. Meanwhile, a tablet PC is competing with a laptop PC in a market in a manner of adopting a display screen bigger than that of a smartphone to emphasize a user request, a function of a PC, differentiation from a smartphone, portability and the like.

Currently, a smartphone, a tablet PC, a laptop PC and the like are forming a mainstream in a market. Compared to a laptop PC, a tablet PC adopts a virtual keyboard or the like as an input means instead of a legacy keyboard in order to emphasize portability. Yet, inconvenience of a user due to the virtual keyboard is continuously brought up. For instance, a user who has bought a tablet PC buys a separate keyboard to use the separate keyboard as an input means instead of the virtual keyboard.

A convertible device has appeared and developed due to the aforementioned user requirement and a trend of a market. The convertible device implements portability of a legacy tablet PC, functions of a laptop PC, performance and the like in a single device and is equipped with such an input means as a keyboard as well. Yet, although a keyboard is mounted on the convertible device, user convenience resulted from using the keyboard, for instance, using the convertible device according to an event is still making inconvenience for a user.

SUMMARY OF THE INVENTION

Accordingly, the present invention is directed to an apparatus and method thereof that substantially obviate one or more problems due to limitations and disadvantages of the related art. A technical task of the present invention is to define various modes according to environment of using a convertible device, an event and the like and provide a convertible device providing user convenience according to the defined modes and a method of controlling therefor.

Another technical task of the present invention is to improve product satisfaction and raise purchasing desire according to the product satisfaction in a manner of planning user convenience according to the aforementioned convertible device and the method of controlling therefor.

Technical tasks obtainable from the present invention are non-limited the above-mentioned technical tasks. And, other unmentioned technical tasks can be clearly understood from the following description by those having ordinary skill in the technical field to which the present invention pertains.

To achieve these objects and other advantages and in accordance with the purpose of the invention, as embodied and broadly described herein, according to one embodiment, a method of controlling a convertible device including a first processing module and a second processing module, the method includes storing mode information for a plurality of operational modes of the convertible device, and first angle data, receiving an input for changing an angle different from an angle of the stored first angle data, detecting second angle data according to the received input, and outputting a predetermined user interface (UI) on an operational mode of the convertible device based on the first and second angle data and the stored mode information.

To further achieve these objects and other advantages and in accordance with the purpose of the invention, as embodied and broadly described herein, according to one embodiment, a convertible device includes at least one of the first processing module and the second processing module that comprises a memory configured to store mode information for a plurality of operational modes of the convertible device, and to store first angle data, a receiving unit configured to receive an input for changing an angle different from an angle of the stored first angle data, a detection unit configured to detect second angle data according to the received input, a controller configured to identify an operational mode of the convertible device based on the first and second angle data and the stored mode information, and control to output a predetermined user interface on the identified operational mode of the convertible device, and an output unit configured to output a predetermined user interface.

Technical solutions obtainable from the present invention are non-limited the above mentioned technical solutions. And, other unmentioned technical solutions can be clearly understood from the following description by those having ordinary skill in the technical field to which the present invention pertains.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

FIG. 14 illustrates a flowchart for explaining a method of controlling a convertible PC via an intelligent start user interface.

DETAILED DESCRIPTION OF THE INVENTION

Figure 1:
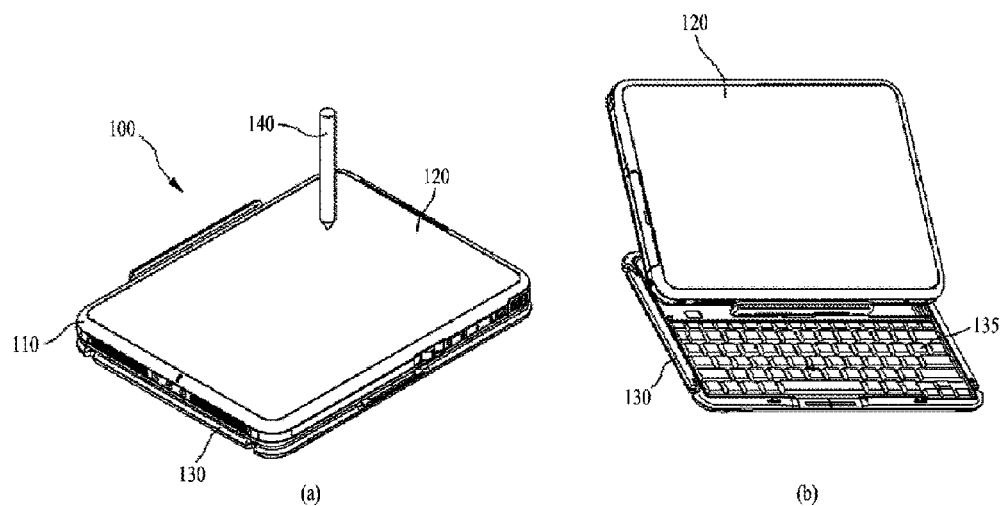
FIG. 1 illustrates a diagram for schematically explaining a convertible PC.

The present disclosure explains a convertible device and a method of controlling therefor in detail with reference to attached drawings in the following description.

A suffix 'module' and 'unit' for an element in the following description is simply used for clarity of writing the present disclosure. Thus, the 'module' and the 'unit' can be used in a manner of being mixed.

Meanwhile, such an ordinal number as 'first-', 'second', 'third' and the like may have a meaning of an order. Or, the terminologies can be used for the purpose of distinguishing one component from another component capable of being overlapped with each other.

In the present disclosure, a 'convertible device' includes a digital device of all types which is configured to implement a plurality of devices or functions of a plurality of the devices in a single device. As a representative example of the convertible device, there may exist a convertible PC. The convertible PC can be developed to provide both a tablet PC function and a laptop PC function. In other word, the convertible PC is forming a new customer base in a market in a manner of increasing portability by being operated in a tablet mode and improving convenience by being operated in a laptop mode in a single device. By doing so, the convertible PC can increase use efficiency and convenience of a user.

A convertible PC is configured in a manner of mainly including a first element and a second element. The first and the second element can be distinguished from each other based on a characteristic of a device or an implementable function. For instance, the first element includes such a display as a touch panel and the like, and the second element includes such input devices as a keyboard, a mouse and the like. Meanwhile, the first or the second element can be used as one of the aforementioned input devices in a manner of being paired with a mobile communication terminal and the like.

Meanwhile, a convertible PC is implemented in such a form as a detachable form of which the first and the second element are detachable, a slide form of which the first element is slid from the second element in a predetermined angle although the first element is not separated from the second element or a swivel form of which the first element is swiveled from the second element.

First of all, the first element of a detachable convertible PC can be used as a tablet PC in a manner of being detached from the second element.

On the contrary, as mentioned in the foregoing description, a convertible PC of a slide form can operate in both a tablet mode and a laptop mode according to an angle (sliding angle) formed by the first element while the first element is slid from the second element. For instance, if a sliding angle formed by the first and the second element corresponds to 0 degree, it may correspond to the tablet mode. On the contrary, if the sliding angle formed by the first and the second element corresponds to an angle except 0 degree, it may correspond to the laptop mode. In this case, when the sliding angle formed by the first and the second element corresponds to 0 degree, if the first and the second element are totally overlapped with each other, as mentioned in the foregoing description, it may correspond to the tablet mode. Yet, if the first and second elements are arranged side by side without an overlapped area or if the first and second elements are not totally overlapped with each other, the convertible PC may operate in the laptop mode. Meanwhile, although the convertible PC of the slide form operates in the laptop mode, a tablet PC function of the convertible PC can be activated according to a setting of a user. In other word, although an input device corresponding to the second element can function as a main input means in the laptop mode, a touch input inputted by a finger, a stylus or the like on such a display as a touch panel and the like is still activated like a tablet mode and the convertible PC may operate according to the touch input. Besides, the convertible PC of the slide form can be slid using a predetermined button mounted in the first or the second element. Or, a user may slide the convertible PC in a manner of directly slide the first element in a random angle.

A convertible PC of a swivel form may rotate or bend a first element including a display from a second element. In this case, for instance, the convertible PC of the swivel form rotates or bends the first element by a form or a scheme different from that of the convertible PC of the slide form based on a hinge, a connection axis or the like.

Meanwhile, a main processing unit including a control unit (including central processing unit (CPU)) and the like, which is related to various modes of a convertible PC and implementation of function, can be implemented in a manner of being included in at least one of the first and second elements.

Meanwhile, a convertible PC is one embodiment of a convertible device in the present specification. For clarity and help understanding of the present invention, the present invention is explained based on a convertible PC of a slide form among the convertible PC. A keyboard is explained as an example of an input means installed in the aforementioned second element, by which the present invention may be non-limited.

FIG. 1 illustrates a diagram for schematically explaining a convertible PC.

According one embodiment of the present invention, a convertible device includes at least one of the first processing module and the second processing module that comprises a memory configured to store mode information for a plurality of operational modes of the convertible device, and to store first angle data, a receiving unit configured to receive an input for changing an angle different from an angle of the stored first angle data, a detection unit configured to detect second angle data according to the received input, a controller configured to identify an operational mode of the convertible device based on the first and second angle data and the stored mode information, and control to output a predetermined user interface on the identified operational mode of the convertible device, and an output unit configured to output a predetermined user interface. For instance, the user interface may correspond to an intelligent start user interface described later.

Here, the first and second angle data is defined as an angle between the first processing module and the second processing module of the convertible device, and wherein the first and second angle data is any one of 0 degree, 45 degrees and 75 degrees. The first and second angle data is linked to the mode information of the convertible device, and wherein the mode information includes a tablet mode and a laptop mode as the operational mode. The controller further controls to output the predetermined user interface containing one or more icons for one or more applications previously mapped according to the executed operational mode.

And, the predetermined user interface contains icons for switching among operational modes. If any icon among icons is selected, the controller further controls to output the predetermined user interface on an operational mode corresponding to the selected icon without any change of an angle of the convertible device. The predetermined user interface contains one or more recent pages which are used for a corresponding operational mode or all operational mode. Each of the one or more pages consists of any one of a web page, a game execution page, a picture page, a video page, a search page and a broadcast program page.

Also, the convertible device further includes a sensing unit configured to sense data from a camera sensor or an eye-tracking sensor mounted in the convertible device, wherein the controller is configured to control the screen to be automatically turned on or turned off based on the sensed data. In a specific operational mode, the controller is configured to apply a battery-saving to the convertible device.

Referring to FIG. 1, a computer system 100 is implemented by a structure by which a first processing unit 110 positioned at the top of the computer system and a second processing unit 130 positioned at the bottom of the computer system are combined. In this case, the first processing unit 110 includes a display unit 120 to which a touch panel and the like are applied and the second processing unit 130 includes such an input device as a keyboard 135. The second processing unit 130 can further include an interface unit to connect with such an input device as a mouse and the like for control convenience of a user.

The computer system 100 can switch between operational modes. For example, the operational modes include a tablet mode shown in FIG. 1a and a laptop mode shown in FIG. 1b. In this case, the tablet mode shown in FIG. 1a corresponds to a form that the first processing unit 110 is mounted on the top of the second processing unit 130. The laptop mode shown in FIG. 1b corresponds to a form that the second processing unit 130 is exposed the outside in a manner of sliding the first processing unit 110 at an angle on the basis of the second processing unit 130.

If a user puts an input on a touch panel of the first processing unit (or module) 110 using a finger or a stylus 140 in the tablet mode shown in FIG. 1a, the computer system 100 recognizes the input and then provides a screen corresponding to the recognized input to the user.

On the contrary, the computer system 100 recognizes a keyboard 135 of the second processing unit (or module) 130 as a main input device in the laptop mode shown in FIG. 1b and then provides a screen of the first processing unit 110, which is slid at an angle, to a user in response to an input of the user inputted via the keyboard.

The computer system 100 corresponds to a convertible PC. The convertible PC can be continuously switched to a tablet mode or a laptop mode. The elements used for implementing one or more functions of the convertible PC, a system body can be comprised in at least one of the first processing unit 110 and the second processing unit 130. Here, for clarity, one embodiment of the present specification explains an example that the system body is installed in the first processing unit 110. Meanwhile, switching an operational mode in the aforementioned convertible PC can be performed by not only a digital control of the system body but also a physical structure of the convertible PC.

Figure 2:
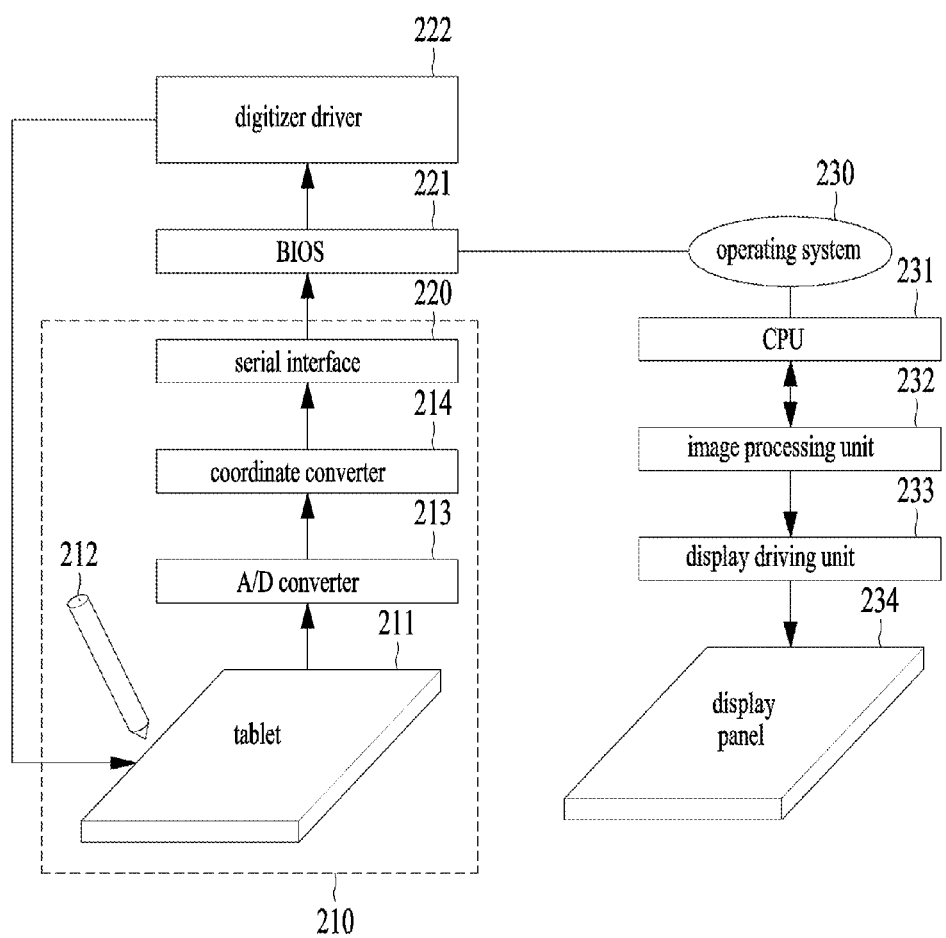
FIG. 2 illustrates a block diagram for explaining an embodiment of a convertible PC.

FIG. 2 illustrates a block diagram for explaining an embodiment of a convertible PC.

In this case, FIG. 2 may correspond to a block diagram of a configuration related to an operation of the first processing unit 110 of the aforementioned FIG. 1 or an operation of the tablet mode operation.

Referring to FIG. 2, a digitizer 210 is a type of an input device. The digitizer is installed in a rear side of a tablet 211 and includes a touch panel of a rectangle shape. The digitizer 210 can further include a stylus 212 of a pen-shape for the convenience of a user putting an input on a tablet.

The tablet 211 is an input device capable of converting a coordinate of X axis and Y axis into binary data using a change of an electromagnetic field, which is changed by an object touched on X and Y coordinate input surface.

If a user moves a stylus 212, coordinate information is read and the coordinate information is delivered to a screen memory space of a computer system. If a tip of the stylus 212, which is sharp point of the stylus, is pushed or buttons are pushed, a command corresponding to the push can be performed.

The digitizer 210 can include an analog/digital (A/D) converter 213 converting an analog change of an electromagnetic field touched on X and Y coordinate input surface into a digital signal according to movement of the stylus 212 and a coordinate converter 214 outputting the digital signal inputted from the analog/digital converter 213 in a manner of converting the digital signal into X and Y coordinate. In the foregoing description, X and Y coordinate value corresponds to binary data appropriate for a computer system.

A serial interface 220 is connected with a computer body configured to drive the digitizer 210. A BIOS 221 and a digitizer driver 222 can recognize a stylus input and the like.

If X and Y coordinate value outputted from the coordinate converter 214 of the digitizer 210 is inputted to the serial interface 220, the BIOS 221 monitors whether the X and Y coordinate value is inputted to the serial interface 220. If the X and Y coordinate value is inputted, the BIOS 221 provides the X and Y coordinate value to the digitizer driver 222. The digitizer driver 222 moves a pointer according to the inputted coordinate value.

A work of the stylus 212 is recognized by the digitizer driver 222 and an OS (operating system) 230 on windows. A CPU 231 drives a display driving unit 233 in a manner of controlling an image processing unit 232 and outputs a response corresponding to the work of the stylus on a display (or touch) panel 234.

Figure 3:
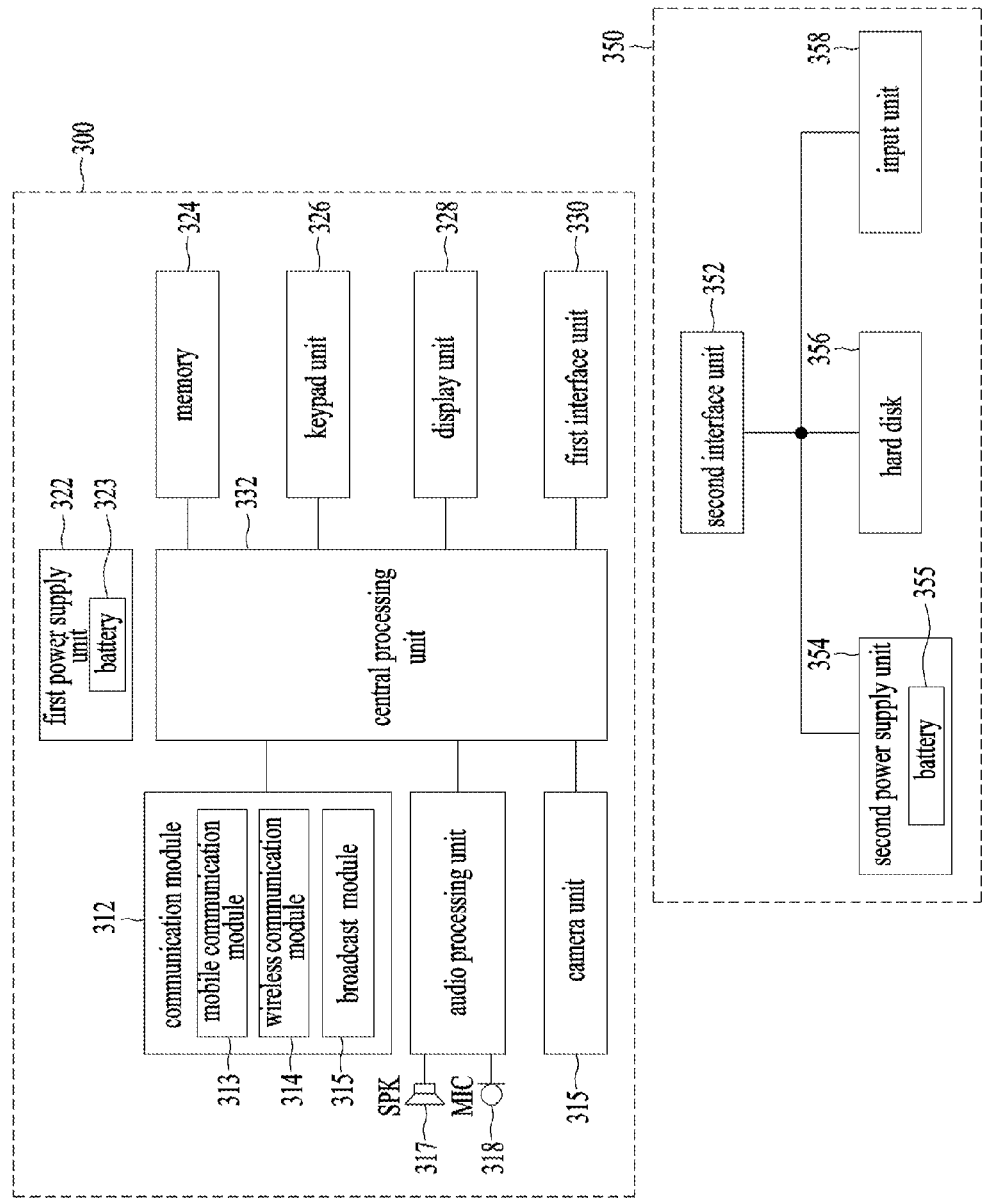
FIG. 3 illustrates a block diagram for explaining another embodiment of a convertible PC.

FIG. 3 illustrates a block diagram for explaining another embodiment of a convertible PC.

Referring to FIG. 3, a convertible PC includes a first processing unit 300 and a second processing unit 350. The first processing unit 300 and the second processing unit 350 may correspond to the first processing unit 110 and the second processing unit 130 in FIG. 1, respectively. Meanwhile, the block diagram of FIG. 2 may correspond to or may be included in the first processing unit 300 shown in FIG. 3.

The first processing unit 300 supports a tablet mode in a manner of performing an operation similar to an operation of a tablet PC. The first processing unit may perform a mobile communication function as well.

The first processing unit 300 can include a communication module 312, an analog audio processing unit 316, a camera unit 320, a first power supply unit 322, a memory 324, a keypad unit 326, a display unit 328, a first interface unit 330, a central processing unit (CPU) (or control unit) 332 and the like.

Meanwhile, one or more elements of first processing unit 300 shown in FIG. 3 may include included in the second processing unit 350 and vice versa.

The communication module 312 includes a mobile communication module 313, a wireless communication module 314, a broadcast module 315 and the like. The communication module can include such various modules supporting a communication protocol as a Bluetooth module and the like to perform a communication with an external device.

The mobile communication module 313 can transmit and receive a signal in wireless. In this case, although the mobile communication module 313 is not depicted, the mobile communication module can include a duplexer, a transmission unit, a reception unit and the like. The mobile communication module 313 may correspond to at least one selected from the group consisting of a code division multiple access (CDMA) module, a wideband code division multiple access (WCDMA) module, a global system for mobile communication (GSM) module and the like.

The wireless communication module 314 corresponds to a module supporting wireless communication. The wireless communication module 314 can provide the internet, i.e., a web service in a full screen in a manner of providing a full-browsing service like a PC does.

The broadcast module 315 supports reception of a digital multimedia broadcasting (DMB) and the like.

The audio processing unit 316 amplifies an audio signal, which is inputted via a microphone (MIC) 318, and converts the signal into a digital audio signal. Or, the audio processing unit 316 converts a digital audio signal into an analog audio signal and outputs the signal via a speaker (SPK) 317 by amplifying the signal.

The camera unit 320 includes a Charge Coupled Device (CCD) sensor or a Complementary Metal-Oxide Semiconductor (CMOS) sensor configured to electronically convert an optical signal of a subject and captures the subject. The camera unit 320 may further include a buffer unit configured to temporarily store frame data for a subject, which is captured by the CCD sensor, the CMOS sensor or the like.

The first power supply unit 322 supplies power to the first processing unit 300. The first power supply unit 322 may be implemented in a form of a battery 323 or can be implemented in a manner of including a battery 323.

The memory 324 stores such a data as an image, a video, an audio, a text and the like and data processed by the CPU 332.

The touch screen unit 326 includes keys capable of inputting texts including one or more menu keys and numbers.

The display unit 328 displays data on a screen according to a control of the CPU 332. Meanwhile, the display unit 328 displays a picture, a video, a user interface (UI) related to a function of the first processing unit 300 and a graphic user interface (GUI) as well as the data.

The display unit 328 can be configured by one of a LCD (liquid crystal display), an OLED (organic light emitting diode), a touch screen and the like. When the display unit 328 is configured by the touch screen including a touch panel and a location detection unit, if a touch is inputted on the touch panel, the location detection unit detects coordinate information of a location on which the touch is inputted and transmits the detected coordinate information to the CPU 332.

The first interface unit 330 makes data communication to be executed with an external device or a second processing unit 350, which is described later, via an interface (e.g., a second interface unit 352). The first interface unit 330 can include a memory interface unit to which an external memory is inserted, a charge interface unit supporting external power and the like.

The CPU 332 controls overall operations of the first processing unit 300.

The second processing unit 350 can include the second interface unit 352, a second power supply unit 354, a hard disk 356, an input unit 358 and the like. The second processing unit can enable a user to use a laptop mode according to a mode or an angle of the first processing unit 300 resulted from a selection or an input of the user.

The second interface unit 352 supports interfacing with the first processing unit 300 and supports data communication with the first processing unit 300.

The second interface unit 352 may further include a charge interface unit (not depicted) to supply external power.

The second power supply unit 354 includes a battery 355 to supply power to not only the second processing unit 350 but also the first processing unit 300.

The hard disk 356 stores data received via the second interface unit 352.

The input unit 358 corresponds to an input means used for inputting data via one selected from the group consisting of a keyboard, a mouse, a mobile communication terminal and the like. If the first processing unit 300 is slid and forms a predetermined mode or an angle, the input unit 358 can be exposed to make a user use the input device 358. A key data inputted via the input unit 358 is interpreted by the central processing unit 332 and can be outputted via the display unit 328.

Meanwhile, although it is not depicted, the second processing unit 350 may further include such various user interfaces capable of supplementing a user interface as a speaker, CD ROM, DVD ROM, a USB terminal, a HDMI terminal and the like. The user interfaces may be included in the first processing unit 300.

If the first processing unit 300 and the second processing unit 350 are connected to each other, the CPU 332 of the first processing unit 300 recognizes the second power supply unit 354, the hard disk 356 and the input unit 358 included in the second processing unit 350 as usable devices, cuts off power of the first power supply unit 322 and may be then able to operate by receiving power from the second power supply unit 354 of the second processing unit 350.

The CPU 332 can control not only overall operation of the first processing unit 300 but also overall operation of the second processing unit 350.

If a function execution command of a user is received via a keypad unit 326 or a display unit 328, the central processing unit 332 executes a function corresponding to the received function execution command.

The CPU 332 controls to output display data such as a UI and a GUI data, which are resulted from executing a function of the first processing unit 300, via the display unit 328. In this case, the CPU 332 can control to output such an additional display data as notification information via the display unit 328. Data displayed via the display unit 328 can include various data including a UI according to an operational mode or an angle/angle data defined in advance, a message indicating that a communication with an external device is available, a message indicating that the first processing unit 300 is charging, battery residual information and the like.

The CPU 332 can control the display unit (in case of configuring the display unit by a touch screen) to operate using a touch pad which is used for a PC such as a laptop. The CPU 332 can enable a user to output text data, a mouse pointer and the like inputted by the input unit 358 of the second processing unit 350 via the display unit 328.

If a storing command is inputted, the CPU 332 stores data in the hard disk 356 of the second processing unit 350 via a first and a second interface unit 330/352. The data correspond to a data stored in the internal of the first processing unit 300 or a data received from an external.

Figure 4:
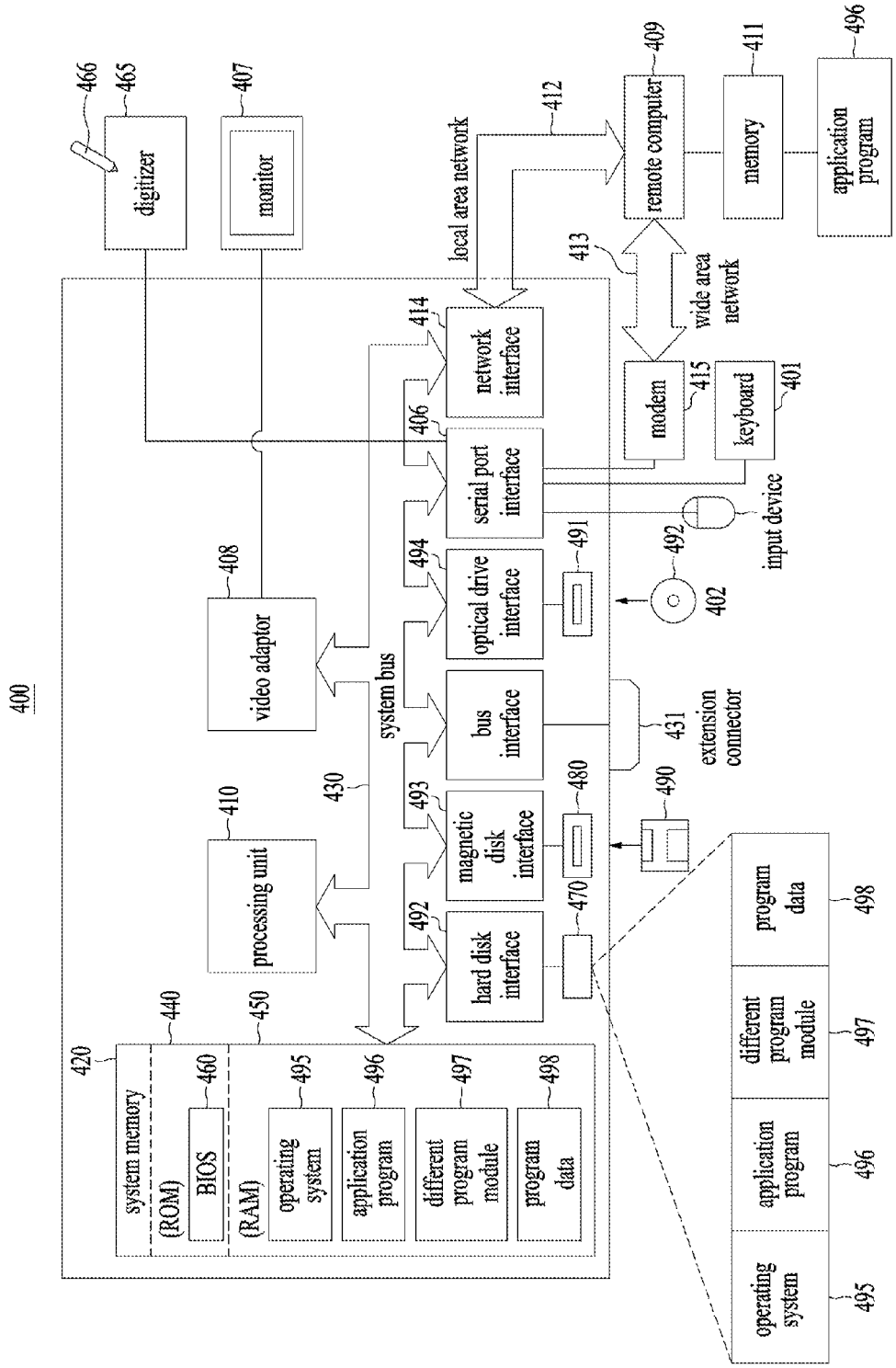
FIG. 4 illustrates a diagram for explaining an embodiment of a computing system of a convertible PC.

FIG. 4 illustrates a diagram for explaining an embodiment of a computing system of a convertible PC.

As shown in FIG. 4, a computing system 400 includes a processing unit 410, a system memory 420 and a system bus 430 connecting various system components including the system memory 420 to the processing unit 410. The system bus 430 may correspond to one of bus structures of various types including a memory bus or a memory controller, a peripheral device bus and a local bus using various bus architectures. The system memory 420 includes a ROM 440 and a RAM 450.

A BIOS 460 including a basic routine, which helps information to be transmitted between components in the computing system 400, is stored in the ROM 440. The computing system 400 also includes a hard disk drive 470 to read and record data on a hard disk (not depicted). The computing system 400 may further include a magnetic disk drive 480 to read or record data on a detachable magnetic disk 490 and an optical disk drive 491 to read or record data on a detachable optical disk 492 such as a CD-ROM or a different optical media. The hard disk drive 470, the magnetic disk drive 480 and the optical disk drive 491 can access the system bus 430 via a hard disk drive interface 492, a magnetic disk drive interface 493 and an optical disk drive interface 494, respectively. A drive and a computer-readable media related to the drive provide a computer-readable command, a data structure, a program module and non-volatile storing of other data to a computing system 400.

A plurality of program modules including an OS 495, one or more application programs 496, a different program module 497 and program data 498 can be stored in the hard disk drive 470, the magnetic disk 490, the optical disk 492, the ROM 440 or RAM 450. A user can input a command and information to the computing system 400 via such an input device as a keyboard 401 and a pointing device or a different input device 402.

An input device can access a processing unit 410 via a serial port interface 406 which is connected to the system bus 430. Yet, the input device can access the processing unit 410 via such a different interface as a parallel port, a game port or a USB. The input device can be directly connected to the system bus 430 via an appropriate extension connector 431 such as a Small Computer System Interface (SCSI) connector, a Peripheral Component Interconnect (PCI) connector, a PCI express connector or an International Society of Automation (ISA) connector. The extension connector 431 can be used to access an extension device such as a media slice or a plurality of extension devices configured by a daisy-chain configuration. A monitor 407 or a display device of a different type accesses the system bus 430 via such an interface as a video adaptor 408. In general, the PC includes such a different peripheral output device (not depicted) as a speaker and a printer except the monitor.

Besides, the computing system 400 can receive and process an input of a user via a digitizer 465 and a stylus 466 belonging to the digitizer 465. Although the digitizer 465 is shown in a manner of being separated from the monitor 407, an input area of the digitizer 465 and a display area of the monitor 407 can be overlapped with each other. The digitizer 465 can be integrated into the internal of the monitor 407. The digitizer may cover up the monitor 407 or may exist as a separate device attached to the monitor 407.

The computing system 400 may operate in a network environment in a manner of accessing a remote computer 409. The remote computer 409 may correspond to a server, a router, a network PC, a peer device or a common network node. Although a memory 411 is depicted only in FIG. 4, in general, the remote computer 409 can include many or all of the components mentioned earlier with reference to the computing system 400. The access includes a local area network (LAN) 412 and a wide area network (WAN) 413.

Figure 5:
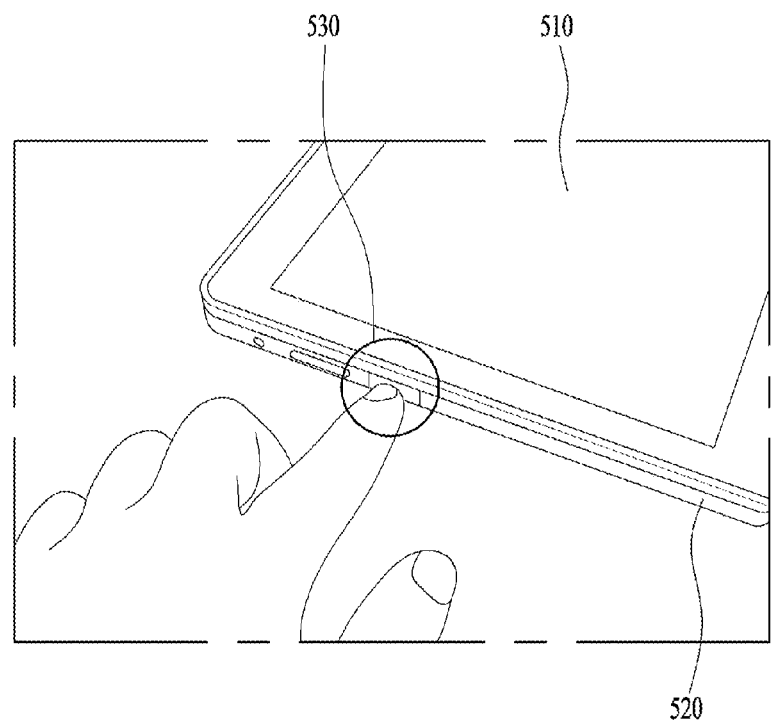
FIG. 5 illustrates a diagram for explaining operations of a convertible PC.
Figure 5:
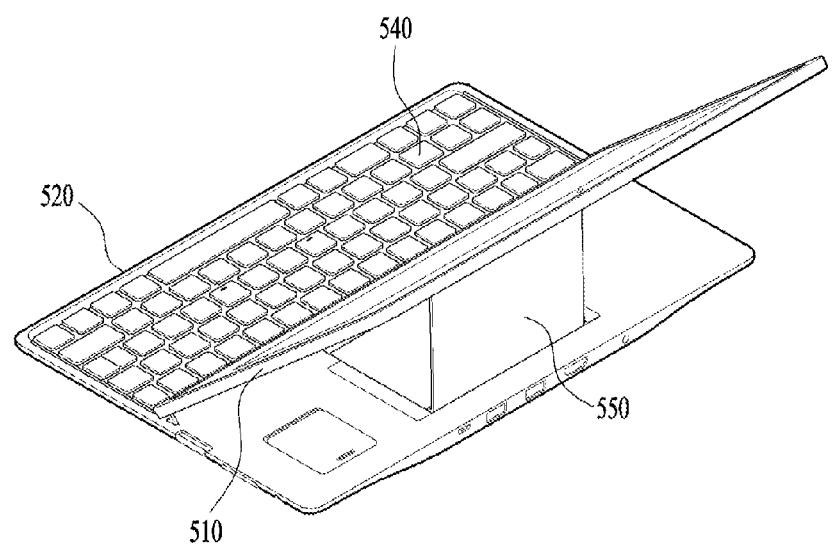
Figure 6:
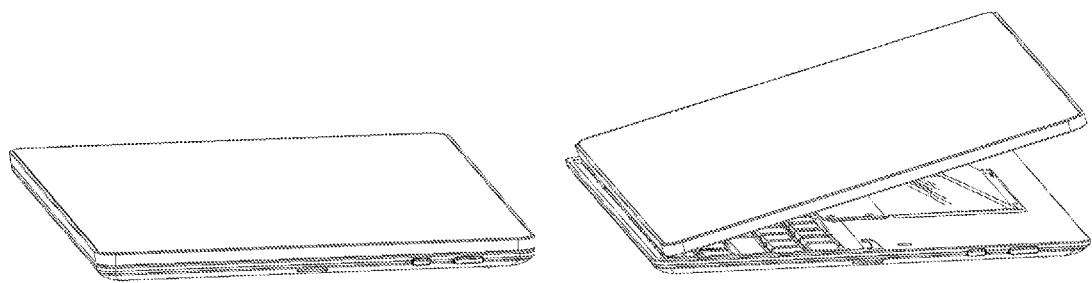
FIG. 6 illustrates a diagram for explaining an embodiment of a sliding process of a convertible PC or an embodiment of a predetermined angle of a convertible PC.
Figure 6:
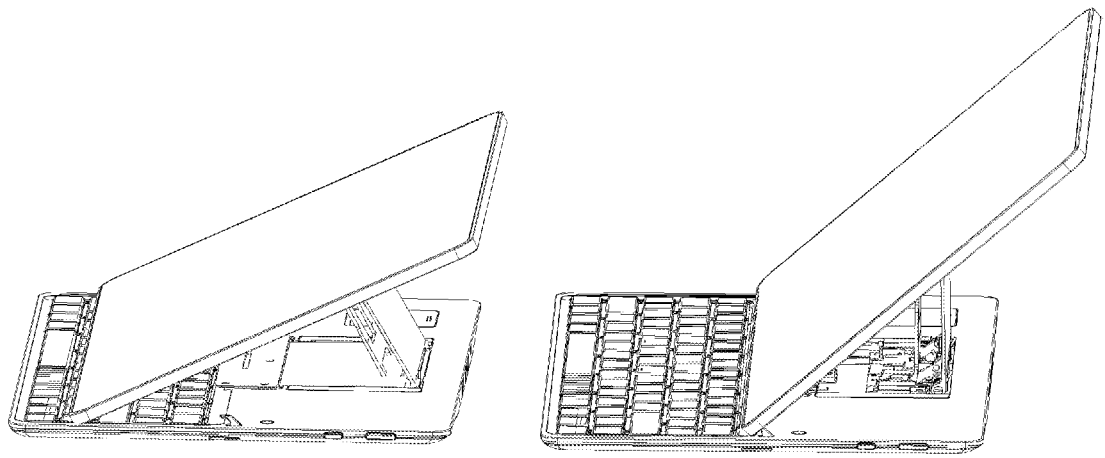

FIG. 5 illustrates a diagram for explaining operations of a convertible PC and FIG. 6 illustrates a diagram for explaining an embodiment of a sliding process of a convertible PC or an embodiment of a predetermined angle of a convertible PC.

As shown in FIG. 5a, when the convertible PC operates in a tablet mode in a manner that a first processing unit 510 and a second processing unit 520 are overlapped with each other, if a predetermined button 530 installed in one side of the second processing unit is pushed, the first processing unit 510 is slid from the second processing unit 520. In particular, the first processing unit is slid from a first function position to a second function position and makes a shape shown in FIG. 5b.

Referring to FIG. 5b, if a user pushes the button 530, the first processing unit 510 is automatically slid from a flat surface to a predetermined angle. In particular, an angle formed by the first processing unit 510 and the second processing unit 520 is changed from 0 degree to a predetermined angle. In this case, the angle may correspond to a random angle. For instance, the angle may correspond to 30 degrees, 45 degrees, 60 degrees, 75 degrees, 90 degrees or the like.

For instance, the first processing unit 510 can be slid from a flat surface to an angle among random angles according to the number of pushing the button 530 pushed by a user. Meanwhile, the user can adjust the angle of the first processing unit 510 to a random angle by directly handling the first processing unit 510 without pushing the button 530.

If the first processing unit 510 is slid to a predetermined angle from a flat surface, an input device, i.e., a keyboard 540 is exposed on the second processing unit 520. Hence, a user can control an output of a corresponding data or a function on a screen of the first processing unit 510 via the exposed keyboard 540.

Meanwhile, if the first processing unit 510 is slid as shown in FIG. 5b, the convertible PC may further include a support to support the slid first processing unit 510.

FIGS. 6a to 6d are diagrams sequentially showing a process of switching a mode from a tablet mode to a laptop mode in a manner that the first processing unit 510 is slid on the basis of the second processing unit 520. Or, FIGS. 6b to 6d may indicates a sliding angle, which is changing according to push of the button 530 pushed by a user in a state of FIG. 6a. Although it is not depicted, if a user pushes the button 530 once more at a sliding angle shown in FIG. 6d, an angle formed by the first processing unit 510 and the second processing unit 520, i.e., a sliding angle may become the vertical (90 degrees).

Meanwhile, the sliding angle shown in FIG. 6d or the vertical sliding angle may become a sliding angle of 180 degrees in a manner that a user pushes the button 530 once more or the user directly handles the first processing unit 510. In other word, if the first processing unit 510 horizontally moves from a state of a flat surface shown in FIG. 6a to expose a part or all of the second processing unit 520, the sliding angle becomes 180 degrees.

In the foregoing description, 180 degrees and 0 degree are identical to each other in terms of an angle. Yet, when a sliding angle corresponds to 0 degree, the second processing unit 520 is not exposed. On the contrary, when the sliding angle corresponds to 180 degrees, the second processing unit 520 is exposed to the outside. Hence, 0 degree and 180 degrees are explained to show the aforementioned difference. In particular, there is no considerable meaning added to 0 degree and 180 degrees in terms of an angle. In other words, if a sliding angle corresponds to 0 degree, it indicates a tablet mode and the keyboard of the second processing unit 520 is not exposed. On the contrary, if a sliding angle corresponds to 180 degrees, it indicates a laptop mode and the keyboard of the second processing unit 520 is exposed.

In the following description, an operation control scheme is explained in more detail in accordance with such environment of a convertible PC as an execution mode, an angle and the like according to the present invention. Meanwhile, an operation control of the convertible PC may vary according to whether software such as an application, a program and the like is executed. But, in the following description, assume a state that a specific application is not executing unless a special comment is explicitly mentioned.

In the following, an execution mode is mainly classified into the aforementioned tablet mode and the laptop mode and an angle is explained with 3 examples including a flat surface (0 degree), 45 degrees and 75 degrees. Meanwhile, the mode can be determined according to an angle. For instance, the convertible PC may operate in the tablet mode at the flat surface (0 degree) and 45 degrees and may operate in the laptop mode at 75 degrees.

Meanwhile, an angle in the present specification indicates an inclined angle of the first processing unit 510 on the basis of the second processing unit 520. The aforementioned 0 degree, i.e., a flat surface indicates a case that the first processing unit 510 and the second processing unit 520 are overlapped with each other.

On the contrary, the aforementioned 180 degrees indicates a case that the first processing unit 510 and the second processing unit 520 are not completely overlapped with each other and a part or all of the second processing unit 520 is exposed. For instance, although the convertible PC is a flat surface (0 degree), the first processing unit 510 and the second processing unit 520 may not be overlapped with each other. In other word, if a tilt sensor is installed in the convertible PC, an angle of the convertible PC can be calculated by the convertible PC itself. In this case, the convertible PC is not always put on a flat surface. Instead, an angle of the second processing unit 520 may correspond to a prescribed angle in a corresponding position. Hence, in this case, when a keyboard of the second processing unit 520 is used, the aforementioned 45 degrees and the 75 degrees may be different from an initially intended angle. This may be inconvenient for a user in case of using the convertible PC of the user. Hence, in this case, the convertible PC may have 45 degrees or 75 degrees as it is on the basis of the second processing unit 520. However, the convertible PC may have an angle less than the aforementioned angle. Or, the convertible PC may have 180 degrees like a slide phone. In particular, in the latter case, i.e., 180 degrees, the keyboard of the second processing unit 520 can be used. In this case, the first processing unit 510 and the second processing unit 520 may not be overlapped with each other.

In the following, outputting a UI according to environment of a convertible PC and an operation control method are explained in detail. Following explanation is described on the basis of an angle as the environment of the convertible PC.

Basically, when a user uses a convertible PC, the user can perform a preferred work in various operational modes or angles. In this case, the user controls the convertible PC with a specific operational mode or a specific angle. It indicates that a work according to an intention of the user is suitable in the corresponding operational mode or angle. Hence, it is required to provide a UI in a manner of configuring the UI according to an operational mode or an angle of the convertible PC to make the user interface to be adapted to an intention of a user.

Hence, various embodiments of configuring an intelligent start user interface or an adaptive start user interface (hereinafter intelligent start user interface) matched with an intention of a convertible PC user is explained in the following description according to the present invention.

Figure 7:
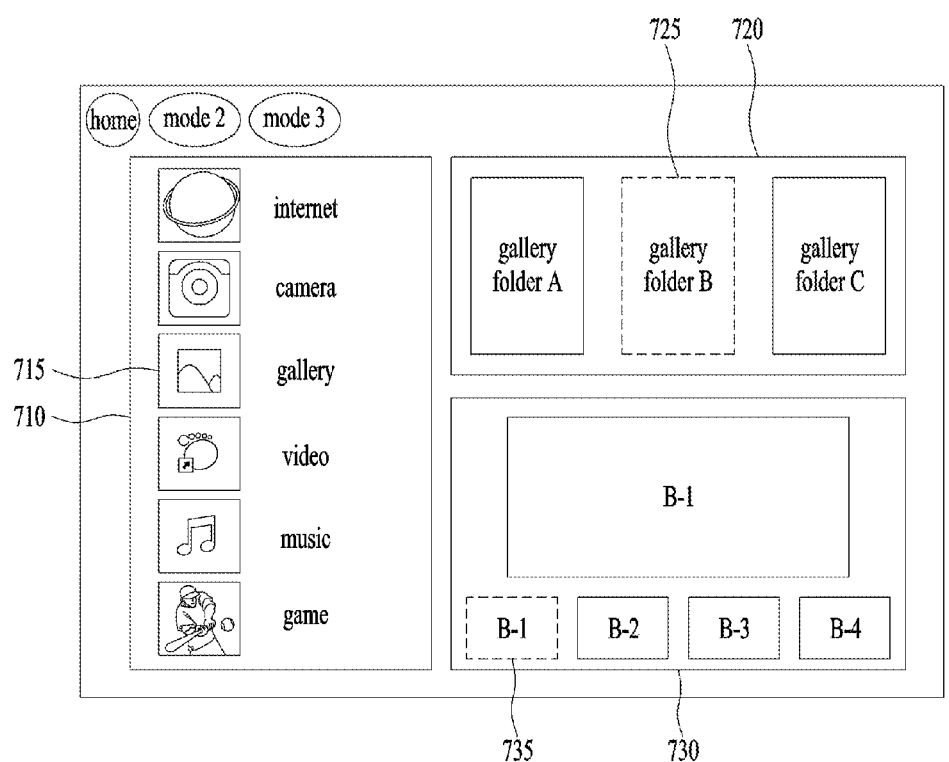
FIGS. 7 and 8 illustrate diagrams for explaining an embodiment of an intelligent start user interface provided at a first angle.
Figure 8:
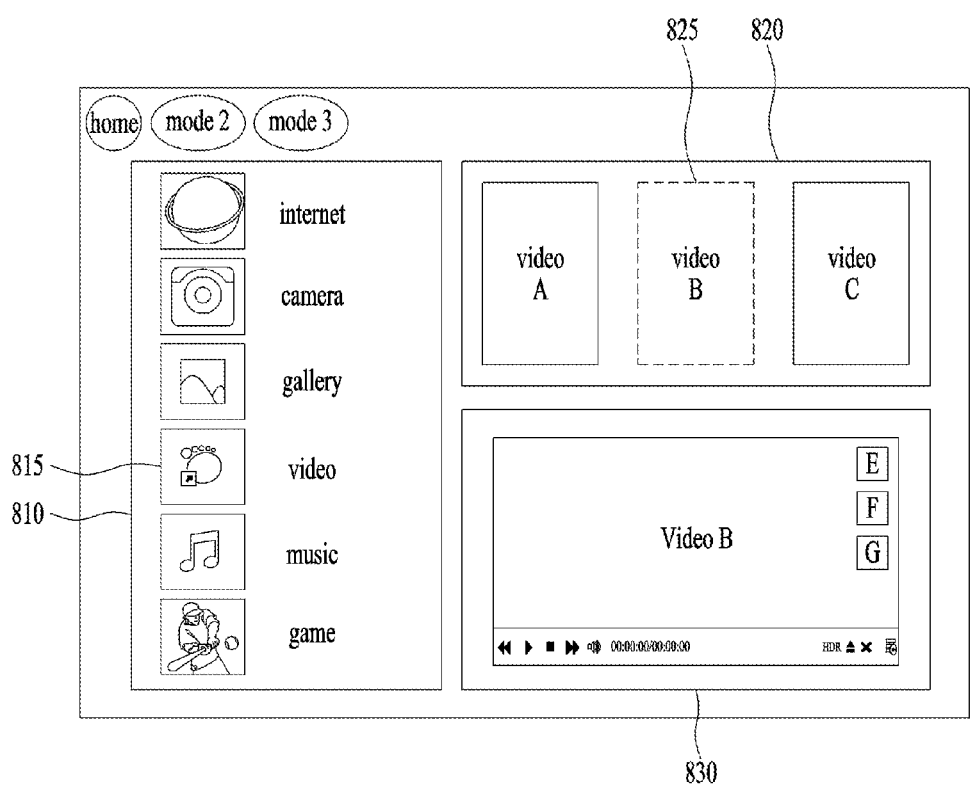

FIGS. 7 and 8 illustrate diagrams for explaining embodiments of an intelligent start user interface provided at a first angle FIGS. 7 and 8 correspond to embodiment of configuring an intelligent start user interface provided in case of a first angle, i.e., a case of a flat surface (0 degree) that a first processing unit and a second processing unit are overlapped with each other. A convertible PC operates in a tablet mode at the first angle.

In this case, the first angle indicates an angle formed between the first processing unit and the second processing unit in case that a convertible PC operating in a tablet mode is in a flat surface state (i.e., 0 degree).

As shown in FIG. 6a, for clarity, following description is explained based on one embodiment of a flat surface state that a first processing unit is activated only while a second processing unit is not exposed.

Hence, an input device of the second processing unit 520 such as a keyboard and the like is not exposed to the external. Hence, a finger of a user, a palm, a stylus such as a touch pen and the like can be used as a main interface.

FIGS. 7 and 8 are diagrams for an intelligent start user interface outputted on a screen of the first processing unit in case that a convertible PC is in a first angle state.

Icon(s) included in the intelligent start user interface relates to a function or an application configured as default at the time of manufacturing a corresponding convertible PC. Or, the icon(s) may be included in the intelligent start user interface according to a user selection. Meanwhile, the icons of the intelligent start user interface can be continuously edited or changed based on a using pattern of a user.

As one embodiment, as shown in FIG. 7 or FIG. 8, the intelligent start user interface can be configured in a manner of including icon(s) according to a function or an application frequently used in a tablet PC or mainly used in a tablet mode by a user at a first angle.

Meanwhile, if a sleep state (or mode) of a convertible PC is released, the intelligent start user interface at the first angle is provided as a first screen. In this case, for instance, if there exist an application, a video or the like used to be played before the convertible PC is sleeping, the application, the video or the like is provided by a pop-up and it is preferable to provide the application, the video or the like in a manner of being activated in a top layer.

Meanwhile, the intelligent start user interface can be provided by a form shown in FIGS. 7 and 8. Or, the intelligent start user interface can be implemented by multiple pages instead of a single page. Each page of the multiple pages can be formed based on various criteria. For instance, each page can be configured based on an attribute of an application, a category and an age. For instance, an execution icon for applications available for a user 15 years old or above can be provided to a first page and an execution icon for applications available for a user 19 years old or above can be provided to a second page.

One embodiment of an intelligent start user interface provided by a convertible PC at a first angle is explained in detail with reference to FIG. 7 in the following.

An intelligent start user interface is configured in a manner of including basic icons, i.e., icons for the internet application, a camera application, a gallery application, a video application (e.g., YouTube), a music application, a game application and the like to be matched with an intention of a user using a tablet mode on which portability is emphasized.

An intelligent start user interface can be configured in various forms or formats. Referring to FIG. 7, basic icons are arranged in a first area 710.

Each icon provided to the first area 710 can be linked to a plurality of data of an application corresponding to the icon. For instance, in case that an icon of a gallery application is selected, a plurality of pictures or images can be configured by a folder form in the gallery application. In this case, a most recently watched picture or image can be provided as a representative image as needed. But, a user may want to access a corresponding application itself. Applications corresponding to the above-mentioned icon may include a video application, a music application, a game application and the like except the gallery application.

First of all, a case of selecting an icon 715 of a gallery application is explained in detail with reference to FIG. 7 in the following.

If the icon 715 of a gallery application is selected from icons of applications provided to a first area 710, one or more images belonging to the gallery application are provided to a whole screen or a second area 720 in a manner of being arrayed. In this case, the images provided to the second area 720 can be provided by a folder form (e.g., a gallery folder A, a gallery folder B and a gallery folder C). In this case, if a user selects the gallery folder B 725, one or a plurality of images belonging to the selected gallery folder B are outputted on a third area 730. Meanwhile, images can be provided to the third area 730 in various forms. As an example, referring to FIG. 7, a selected image or a first image 735 (B-1) in a folder is provided by an image of a big size and the rest of images can be provided by a list form (B-2, B-3, B-4) at the bottom of the image of the big size.

Subsequently, a case of selecting an icon 815 of a video application is explained in detail with reference to FIG. 8 in the following.

If the icon 815 of a video application is selected from a plurality of icons provided to a first area 810, one or more videos (e.g., a video A, a video B and a video C) belonging to the video application are provided to a whole screen or a second area 820 in a manner of being arrayed.

Meanwhile, referring to FIG. 8, since a video includes various items according to a user, a category and the like, each item of the second area 820 can be implemented by a folder form. If each item of the second area 820 is not configured by a folder structure, a most recently played video, a most recently downloaded video, a most recently uploaded video and the like can be provided by a list form. Or, a single video can be played.

Subsequently, if a predetermined video item (video B) 825 is selected from the second area 820, the controller provides the selected video item to a third area 830 together with a playback control tool (e.g., playback bar). In this case, the played video item can be provided by a whole screen instead of the third area 830. Meanwhile, a video item related to the video item provided to the third area 830 can be provided by a list form in a predetermined area of a screen on which the video is played. The list may include an identifier identifying each video, a representative thumbnail image and the like.

Meanwhile, a video item in the list may correspond to a video item identical to the video item of the second area 820 or a video item completely different from the video item of the second area 820. For instance, if videos are provided by a folder form in the second area 820, a predetermined item in the video folder is preferentially played in the third area 830 and a different video item in the video folder is provided by the list form. Or, when a convertible PC is connected to the internet, if a played video item corresponds to a series, video items included in the list may correspond to information on a downloaded relevant series.

In this case, the information may correspond to link information on the list video item or address information and may include a representative thumbnail image. If a user selects a predetermined item from the list, the predetermined item can be played in a manner of streaming or being downloaded based on address information of a linked video item. The above-mentioned playing scheme can be determined according to a situation of a network such as an attribute of a content providing server, traffic and the like.

Besides, various functions related to a bookmark, a timeshift, a time machine, a Personal Video Recorder (PVR) and the like can be performed for a video item provided to the third area 830.

Figure 9:
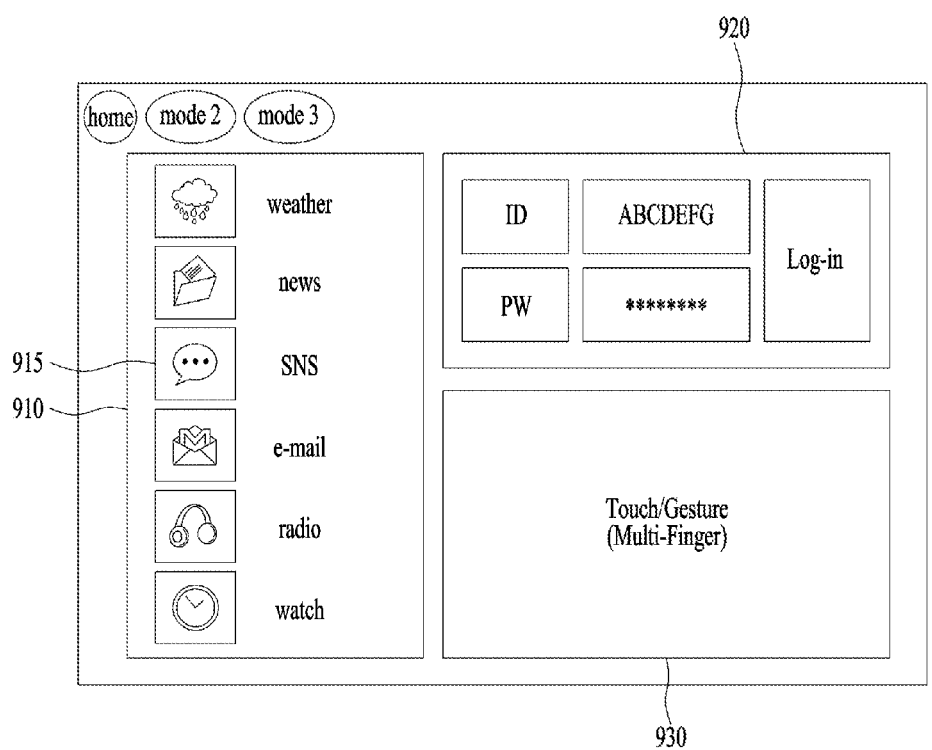
FIG. 9 illustrates a diagram for explaining an embodiment of an intelligent start user interface provided at a second angle.

FIG. 9 illustrates a diagram for explaining an embodiment of an intelligent start user interface provided at a second angle.

In this case, as shown in FIG. 6c, one embodiment of the present invention is explained with a case that the second angle, i.e., an angle formed by a first processing unit on the basis of a second processing unit, corresponds to 45 degrees.

As mentioned in the foregoing description, if an angle formed between the first processing unit and the second processing unit of a convertible PC corresponds to the second angle, it is required to provide such applications delivering real-time information as a watch application, a weather application, a news application, an e-mail application, a social networking service (SNS) application, a radio application and the like via an intelligent start user interface and it may satisfy an intention of a user. Meanwhile, a main interface of the intelligent start user interface at the second angle may correspond to a stylus such as a touch pen.

In case of providing the intelligent start user interface at the second angle, a convertible PC can detect eye contact duration of a user via a camera sensor or an eye tracking sensor installed in the first processing unit or the second processing unit. In particular, the convertible PC compares the eye contact duration of the user detected by a sensor with a predetermined duration and may be able to control a display screen of the first processing unit to be automatically turned on/off according to a result of the comparison. In this case, the predetermined duration can be arbitrarily changed by a user. And, the predetermined duration can be changed in phases according to a residual battery capacity of the convertible PC itself. For instance, although a user has set such duration as 10 seconds in advance, if a battery remains of a convertible PC is less than a predetermined level, the duration is changed to a duration shorter than 10 seconds to most efficiently use the battery of the convertible PC. In this case, it is preferable to induce a user to supply power in a manner that the convertible PC periodically outputs a notice for the battery remains if necessary.

Meanwhile, in case of providing an intelligent start user interface at a second angle, a convertible PC can maximally utilize a touch interface. For instance, the intelligent start user interface can process such applications (first applications) not requiring a password, log-in, unlock for a device as a weather application, a news application, a watch application and the like and such applications (second applications) requiring a password, log-in, unlock as an e-mail application, an SNS application and the like. In the former case, a user can execute a quick start of a corresponding application without a separate additional input in a manner of simply mapping to multi-finger in a sleep state by maximally utilizing the touch interface. On the contrary, in the latter case, a user can execute a corresponding application using such a scheme as fingerprint recognition, pattern recognition, a password input or the like separately or together with the multi-finger.

Meanwhile, in case of providing an intelligent start user interface at a second angle, a convertible PC can control a predetermined application in the intelligent start user interface by maximally utilizing a touch area. For instance, in case of executing a radio application, it is able to control the radio application by touching a different area or mapping multi-finger to various tools configured to control the radio application.

Embodiment of configuring an intelligent start user interface at a second angle is explained with reference to FIG. 9 in the following.

First of all, referring to FIG. 9, the aforementioned first applications and the second applications are arranged in a first area 910 without being distinguished from each other. For instance, this arrangement may vary according to using frequency of applications included in the intelligent start user interface at the second angle. In particular, an application of high using frequency can be positioned at the top of the first area 910 of the intelligent start user interface.

On the contrary, the first applications and the second applications can be respectively provided to areas different from each other of the intelligent start user interface. In this case, a screen can be divided into two screens by a first depth.

Subsequently, an additional screen for an application selected by a lower depth can be configured according to a selection of a user.

As mentioned in the foregoing description, such applications delivering real-time information as a weather application, a news application, an SNS application, an e-mail application, a radio application and a watch application are included in the first area 910 of the intelligent start user interface at the second angle.

In this case, if a user selects an SNS application 915 from the intelligent start user interface, the controller can determine whether or not the selected application has a first application attribute or a second application attribute. Since an attribute of the selected application (e.g., the SNS application) has the second application attribute, the controller generates an input window in a second area 920 to receive an input of a log-in data.

In this case, for instance, if the input window used for receiving the input of the log-in data is generated and a touch input of a user is received, the controller can generate a virtual keyboard in a third area 930. Or, the controller can generate the virtual keyboard overlaying the intelligent start user interface.

As mentioned in the foregoing description, the virtual keyboard can be provided to the third area 930 to input a log-in data to an input window of the second area 920. After a log-in process is completed via the second area 920, an interface function to receive a touch or a gesture (multi-finger) input can be performed on the third area in relation to execution of a connected SNS application.

Figure 10:
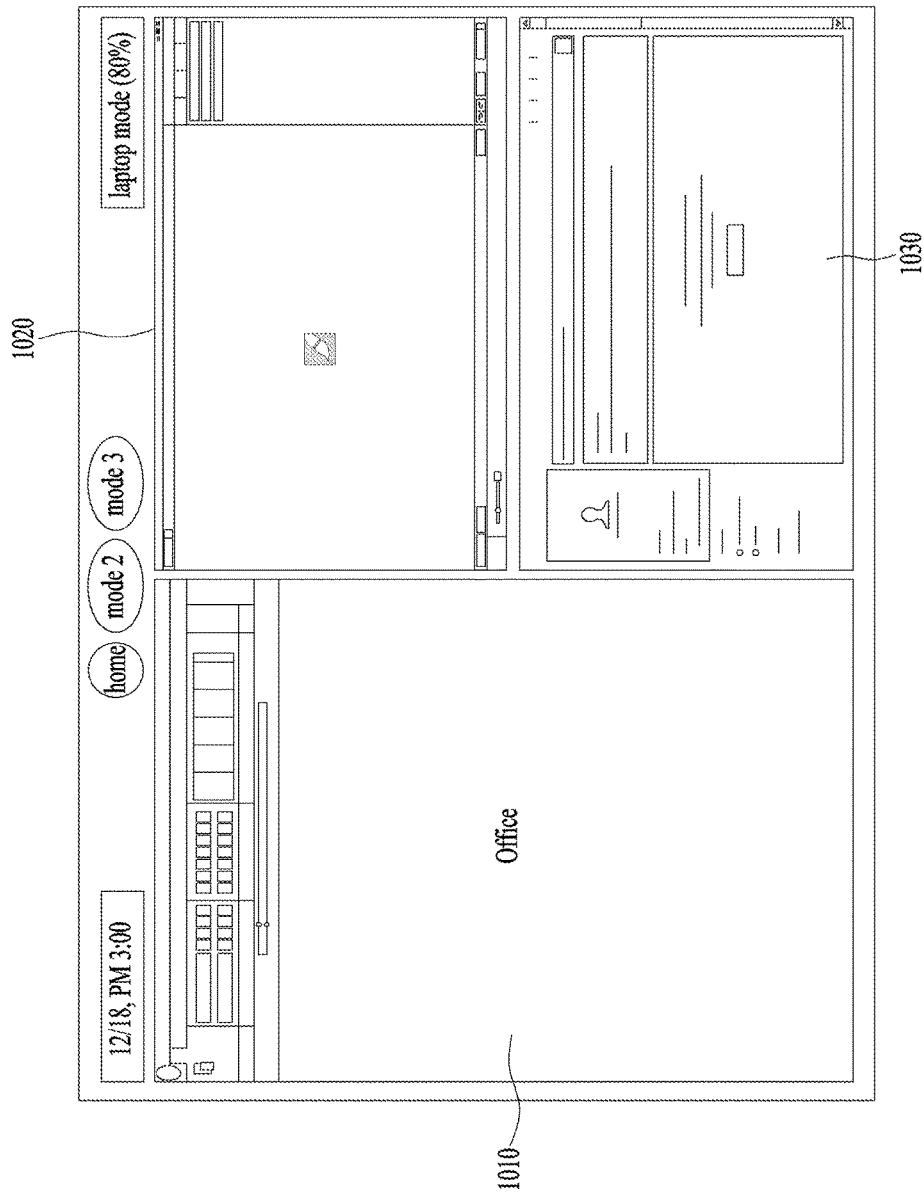
FIG. 10 illustrates a diagram for explaining an embodiment of an intelligent start user interface provided at a third angle.

FIG. 10 illustrates a diagram for explaining an embodiment of an intelligent start user interface provided at a third angle.

In this case, as shown in FIG. 6d, one embodiment of the present invention is explained with a case that a third angle, i.e., an angle formed by a first processing unit on the basis of a second processing unit, corresponds to 75 degrees.

As mentioned in the foregoing description, if an angle formed between the first processing unit and the second processing unit of a convertible PC corresponds to the third angle, it is required to provide such applications for productivity in a laptop mode instead of portability or time as a document application, a video editing application, a blog making application and the like via an intelligent start user interface and it may satisfy an intention of a user. Meanwhile, unlike the first and the second angle, a main interface of the intelligent start user interface at the third angle may correspond to a keyboard or a mouse installed or connected to the first processing unit or the second processing unit instead of a stylus such as a touch pen. However, in this case, a touch input inputted via the stylus or the like may not be inactivated.

As mentioned in the foregoing description, in case of providing an intelligent start user interface at a third angle, a convertible PC intends to provide environment for productivity unlike the intelligent start user interface at different angles. Hence, in this case, if a user adjusts an angle of the convertible PC, a main interface can be automatically switched from a touch or a stylus into a keyboard or a mouse. Moreover, a battery-saving technology can be applied as well. For instance, the battery-saving technology can be applied at the third angle only without being applied in a different mode or an angle. This is because a mode of the convertible PC corresponds to a laptop mode at the third angle unlike a tablet mode at the first and the second angle. When productivity applications are provided via the intelligent start user interface, since hours of use of a corresponding application is relatively long and it is required to store or backup an inputted data, battery remains is sensitive issue. This is because concerning about a data loss at the third angle is relatively higher than that at a different angle or an operational mode. Hence, the battery-saving technology can be applied at the third angle only without being applied at a different angle.

One embodiment of configuring an intelligent start user interface provided at a third angle is explained in more detail with reference to FIG. 10 in the following.

Referring to FIG. 10, an intelligent start user interface provides a document application to a first area 1010. A video editing application and a blog making application are included in a second area 1020 and a third area 1030, respectively.

In this case, the first area to the third area 1010 to 1030 can be automatically provided on a whole screen at the same time according to an angle change or a control in a sleep state. Or, one of the three areas can be provided only. Meanwhile, such a video playback player application as YouTube can be provided to the second area 1020 instead of the video editing application. By doing so, a user is able to watch a video while writing a document in the first area 1010 via the document application. Or, such an online communication application as Skype can be provided to the second area 1020. By doing so, a user may simultaneously use an application executed in the first area 1010 or the third area 1030 while performing communication in the second area.

Meanwhile, although it is not depicted, the intelligent start user interface can be configured in a manner that a search engine application is provided to the first area 1010 and a productivity application is provided to at least one of the second area 1020 and the third area 1030.

As mentioned in the foregoing description, the first to the third angle intend to configure and provide the intelligent start user interface based on themes including portability, time and productivity on the basis of each angle and an intention of a user for the angle. According to the present invention, since a user is able to easily and promptly access and use applications without an additional access after an angle control of a convertible PC, the intelligent start user interface can provide convenience to the user.

In the following, different embodiments of configuring an intelligent start user interface are explained with an example of the aforementioned first to the third angle.

Figure 11:
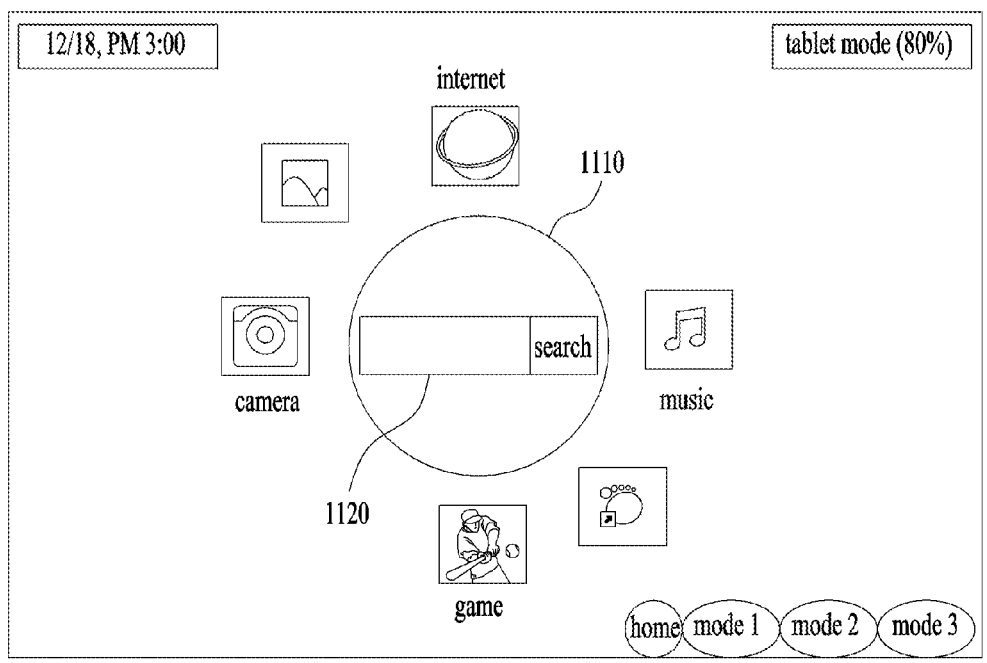
FIGS. 11 to 13 illustrate urate diagrams for explaining an embodiments of an intelligent start user interface provided at a predetermined angle.
Figure 12:
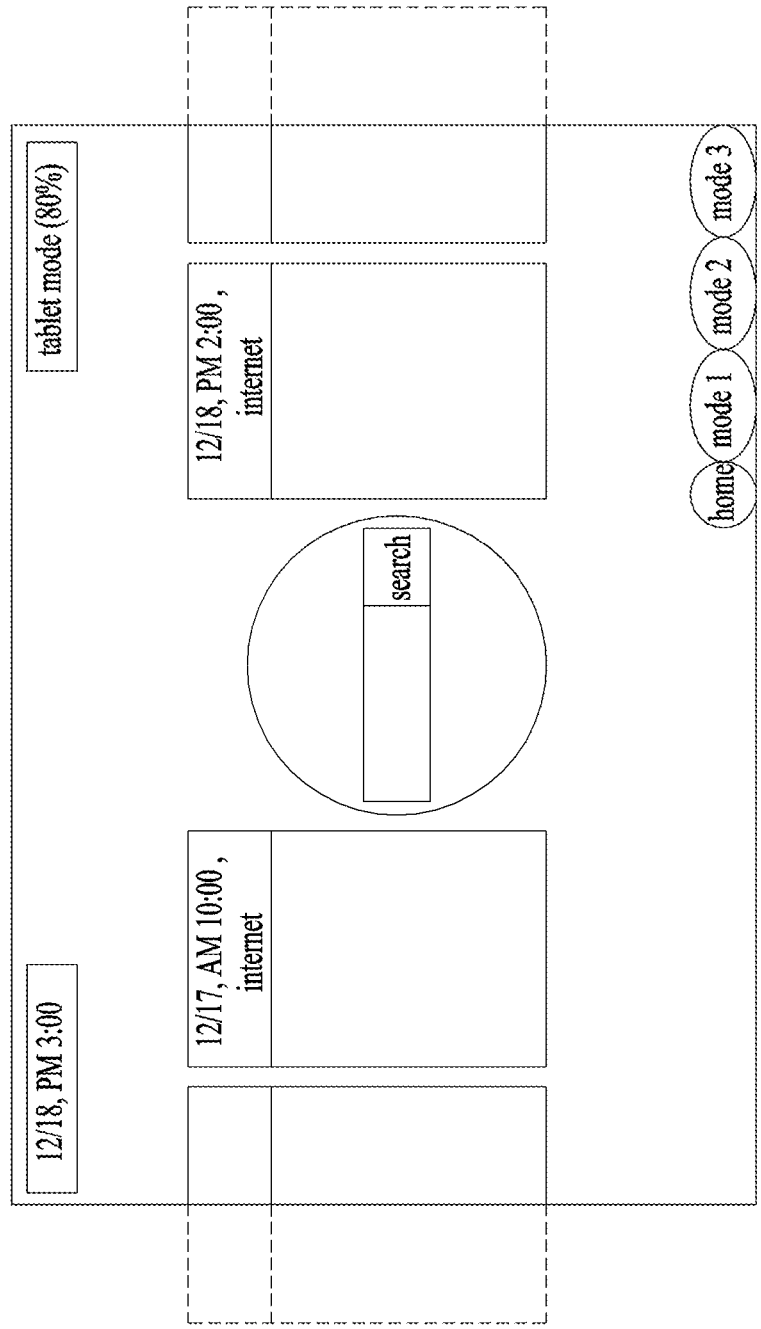
Figure 13:
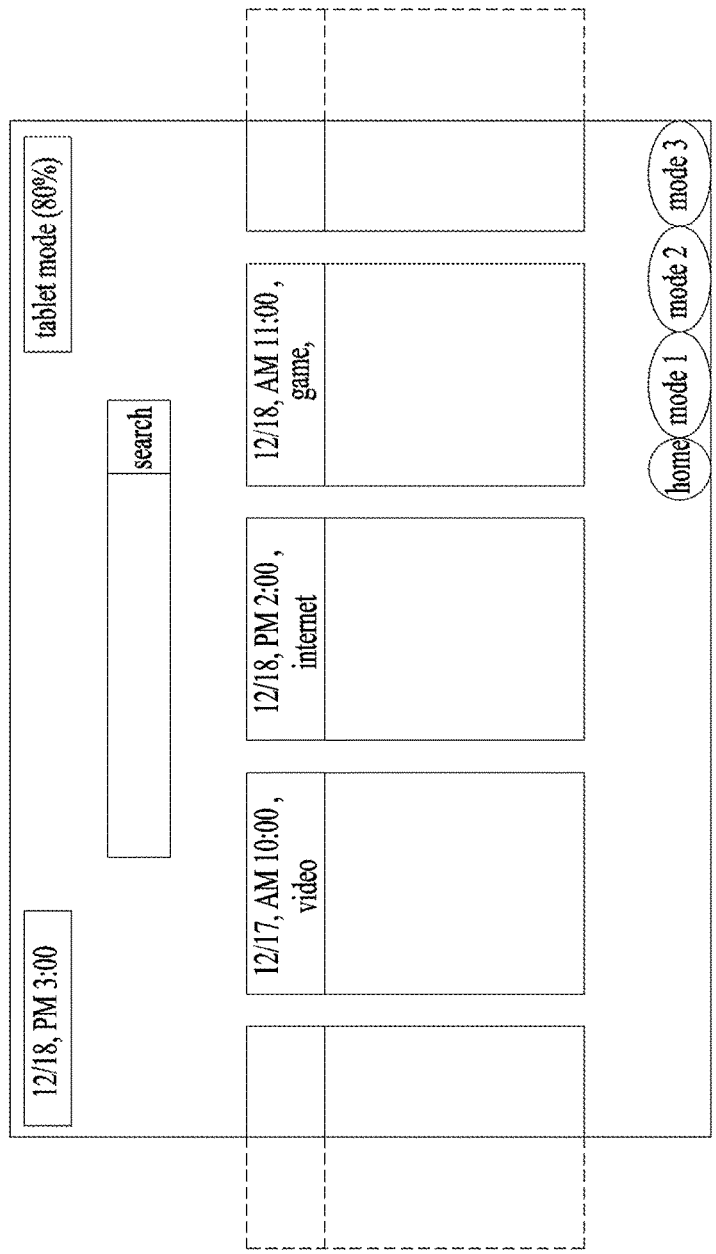

FIGS. 11 to 13 illustrate diagrams for explaining embodiments of an intelligent start user interface provided at a predetermined angle.

In this case, the predetermined angle may correspond to one of the angles mentioned earlier in FIGS. 7 to 10. Hence, the embodiments of the intelligent start user interface explained in FIGS. 11 to 13 can be implemented in various ways in a manner of being replaced with the intelligent start user interface mentioned earlier in FIGS. 7 to 10 or in a manner of being combined with the intelligent start user interface mentioned earlier in FIGS. 7 to 10.

In the following, for clarity, embodiment of an intelligent start user interface is explained without being limited to a specific angle. Yet, as mentioned in the foregoing description, each of the embodiments of the intelligent start user interface explained in the following can be implemented in a manner of being replaced with the intelligent start user interface mentioned earlier in FIGS. 7 to 10 or in a manner of being combined with the intelligent start user interface mentioned earlier in FIGS. 7 to 10.

Referring to FIG. 11, an intelligent start user interface is configured in a manner that a UI 1110 of a circle form is provided to a center of a screen and a search window (or area) 1120 is provided to the inside of the UI. Applications related to portability, time and productivity are arranged in the vicinity of the UI 1110 of the circle form.

In this case, a watch application is automatically implemented for the UI 1110 of the circle form and the UI of the circle form can be provided in an analog or a digital form. Or, a compass application can be automatically implemented instead of the watch application to provide the UI 1110 of the circle form.

The search window 1120 performs searching for a data inputted by a user in a manner of communicating with a predetermined external server when the internet is available. A search result received from the external server is outputted on a different area of a screen. Meanwhile, if a data input request for the search window 1120 is received from a user, an input of one or more search terms can be received by providing a virtual keyboard overlaying the intelligent start user interface which is provided on the screen. Or, the input of the one or more search data can be performed via a voice. In this case, a pop-up window is used to indicate that a voice application is activated. Subsequently, text data, which is processed in response to voice of a user, is provided to the search window 1120. If the user pushes a search button, a search process is performed in a manner of communicating with the external server.

Meanwhile, referring to FIG. 11, if an icon of an application included in the intelligent start user interface is selected or if a user touches an icon and drags the icon to a direction of an edge of a screen while touching the icon, the application can be activated. For instance, in the former case, if an internet application icon is selected, the controller enables a user to search for the internet in a manner of executing a web browser of a small size in a different area of a screen. On the contrary, in the latter case, the controller can execute a web browser via a whole screen in a manner of switching a screen. This method can be identically applied to different applications as well. Meanwhile, as mentioned in the latter case, in case of switching a screen, it is able to provide not only a screen configuration for a corresponding application but also a relevant application or a data in consideration of a history or a using pattern of a user to provide convenience to the user.

Referring to FIG. 12, similar to FIG. 11, a UI of a circle form and a search window are provided. And, application screens of a page form are provided to the left and the right of the UI of the circle form according to a using pattern of a user and the like.

In this case, for instance, applications which are used today are arranged at the right of the UI in time order and applications which are used yesterday are arranged at the left of the UI in a time order.

An application included in a page can be determined according to a corresponding angle based on the aforementioned portability, time and productivity.

And, each page may not correspond to an icon form. For instance, if a user uses an internet application on Dec. $18^{th}$ PM 2:00, accesses such a web site as A and then a convertible PC is in a sleep state, the A site can be executed with a web browser in a corresponding page.

Meanwhile, for instance, if a page corresponding to an application arranged at the left/right of a UI is dragged to up/down direction and is moved to a direction of an edge, the page can be automatically changed. Or, if a page is moved to a center of the user interface of the circle form, the page can be changed to a different page. By doing so, a user can access a page not provided on an initial screen.

Referring to FIG. 13, unlike FIG. 12, a search window is provided to a separate area. And, similar to FIG. 12, pages are provided to a center of a screen. Hence, a user can access a different page by touching and dragging a page to a left/right direction.

Meanwhile, if a user wants to return to a normal screen from an intelligent start user interface provided by a screen of a convertible PC, as shown in FIGS. 11 to 13, the user can switch to an original normal screen by pushing a home button situating at the right bottom of the screen.

Meanwhile, data used at a different angle can be applied at a corresponding angle for an identical application. For instance, following description is explained under an assumption of an internet application. In order of time, a user uses the internet application in a manner of accessing A-1 site at a first angle, accessing A-2 site at a second angle and accessing A-3 site at a third angle. In this case, although the user most recently uses the internet application by accessing the A-3 site, if the user intends to use a convertible PC at the first angle, the A-3 site is provided to the user instead of the previously used A-1 site.

Meanwhile, referring to FIGS. 7 to 13, separate buttons can be included in one area of a screen. For instance, the buttons include a home screen switch button, a first operational mode switch button, a second operational mode switch button, a third operational mode switch button and the like. For instance, the home button switch button makes a use of the provided intelligent start user interface to be terminated and makes the intelligent start user interface to be switched to a home screen or an original screen of a convertible PC. Meanwhile, as mentioned in the foregoing description, the first to the third operational mode switch button are used to switch a specific intelligent start user interface provided based on an initial angle or a mode to a different intelligent start user interface which is configured based on a different angle or operational mode. For instance, an intelligent start user interface shown in FIG. 9 is provided at a second angle. In this case, for instance, if a user intends to use an intelligent start user interface provided at a third angle, the user may simply push the button to use the intelligent start user interface provided at the third angle without separately changing an angle.

Meanwhile, although it is not depicted, if power of a convertible PC is turned on or a sleep state is released at a predetermined initial angle or operational mode, each of the intelligent start user interfaces shown in FIGS. 7 to 10 is respectively provided as a single page. If a user selects an intelligent start user interface corresponding to a page, it may provide an intelligent start user interface selected at a corresponding angle or operational mode.

Or, although it is not depicted, as mentioned earlier in FIGS. 7 to 10, after an intelligent start user interface, which is mapped at a specific angle or operational mode, is provided, if a user puts a pointer on an edge of a screen for more than a predetermined time, an icon used for accessing an intelligent start user interface, which is mapped at a different angle or operational mode, is outputted. And, it is able to switch to a user interface according to a selection of a user.

Meanwhile, in the foregoing embodiments, switching of an intelligent start user interface according to an angle is explained only. On the contrary, as mentioned in the foregoing description, if an intelligent start user interface is switched, an angle of a convertible PC can be automatically changed according to the switched intelligent start user interface. For instance, when a user uses an intelligent start user interface shown in FIG. 7 in a tablet mode at a first angle of a convertible PC, if the user switches the intelligent start user interface shown in FIG. 7 to an intelligent start user interface shown in FIG. 8, the first angle of the convertible PC is automatically switched to a second angle corresponding to the intelligent start user interface of FIG. 8.

Besides, for instance, when a battery-saving technology is applied or activated at the aforementioned third angle only, if battery remains becomes less than a predetermined criteria (15%) while a work is performed at the first angle or a second angle, a physical angle of a convertible PC can be automatically switched to the third angle according to the battery-saving technology. In this case, a user may select one of a previously used intelligent start user interface or an intelligent start user interface configured in advance according to the third angle at the time of switching the physical (or actual) angle of the convertible PC. However, in this case, it is preferable to notice a user of the change before the physical angle of the convertible PC is changed. An application or data, which is used before the change, is temporarily stored and can also be provided to a top layer at a changed angle.

FIG. 14 illustrates a flowchart for explaining a method of controlling a convertible PC via an intelligent start user interface.

A method of controlling a convertible device capable of being switched to a tablet mode and a laptop mode as an operational mode at multi-angle according to the present invention is explained in the following.

A memory unit of a convertible PC stores information on a current angle of a convertible PC (S1410).

Subsequently, a detection unit of the convertible PC detects a change of the angle of the convertible PC after the step S1410 (S1420).

A controller of the convertible PC receives information on the change of the angle detected by the detection unit, parses the received information on the change of the angle and compares the changed angle with the stored current angle information. The controller of the convertible PC changes a mode of the convertible PC according to a result of the comparison (S1430).

The controller of the convertible PC outputs a predetermined user interface on a screen or activates a predetermined function according to the changed mode (S1440).

In the foregoing description, the user interface or the function is outputted or activated in case that a screen is released from a sleep state at the detected changed angle. In particular, the user interface can include one or more icons for an application which is related to at least one of portability, time and productivity according to the angle.

Or, a method of controlling a convertible device including a first processing module and a second processing module, the method includes storing mode information for a plurality of operational modes of the convertible device, and first angle data, receiving an input for changing an angle different from an angle of the stored first angle data, detecting second angle data according to the received input, and outputting a predetermined user interface (UI) on an operational mode of the convertible device based on the first and second angle data and the stored mode information.

And, the first and second angle data is defined as an angle between the first processing module and the second processing module of the convertible device, and wherein the first and second angle data is any one of 0 degree, 45 degrees and 75 degrees. The first and second angle data is linked to the mode information of the convertible device, and wherein the mode information includes a tablet mode and a laptop mode as the operational mode. The predetermined user interface contains one or more icons for one or more applications previously mapped according to the executed operational mode. The predetermined user interface contains icons for switching among operational modes. If any icon among icons is selected, the convertible device outputs a predetermined user interface on an operational mode corresponding to the selected icon without any change of an angle of the convertible device. The predetermined user interface contains one or more recent pages which are used for a corresponding operational mode or all operational mode. Each of the one or more pages consists of any one of a web page, a game execution page, a picture page, a video page, a search page and a broadcast program page.

Meanwhile, the method further comprises detecting sensing data from a camera sensor or an eye-tracking sensor mounted in the convertible device. And, the convertible device controls the screen to be automatically turned on or turned off based on the sensed data. Also, in a specific operational mode, the convertible device applies a battery-saving to the convertible device.

Meanwhile, although it is not depicted in the present specification, an arrangement order or an array order of icons or applications arranged on a screen of the first processing unit can be changed according to a change of an operational mode or an angle. And, a specific icon or a specific application is provided in a specific operational mode or a specific angle only. The specific icon or the specific application may not be exposed in a different operational mode or a different angle like a hiding function does. Meanwhile, the aforementioned control can be modified according to a selection of a user. In particular, a user can select an icon or an application, which is provided or activated on a screen in an operational mode or an angle preferred by the user.

Although a lock of a convertible PC is not released, the aforementioned intelligent start user interface can be immediately controlled in case that a display state is released from a sleep state. The intelligent start user interface can be implemented to access a selected icon. If a specific icon is selected from icons of the intelligent start user interface, it may require unlocking of the convertible PC.

Besides, the present invention relates to a convertible PC and shows an example of operating in a tablet mode and a laptop mode according to an angle only based on a single OS. Although each of the aforementioned embodiments is based on the single OS, by which the present invention may be non-limited. The embodiments of the present invention may operate based on a dual OS or multiple OS. For instance, if a convertible PC operates in a tablet mode according to an angle, an intelligent start user interface including an application icon is configured based on a first OS. If a convertible PC operates in a laptop mode, an intelligent start user interface including an application icon can be configured based on a second OS.

In this case, the first OS corresponds to an OS for a mobile device used for a smartphone, a PDA, a tablet PC and the like. The second OS corresponds to an OS for a PC, a laptop and the like. Yet, the first and the second OS may be non-limited by the aforementioned example. Hence, the first OS and the second OS may be reversed. A preset OS is implemented according to each angle and an intelligent start user interface can be configured in response to the preset OS. Meanwhile, after the intelligent start user interface is provided, a convertible PC can be controlled based on the corresponding OS as long as an angle does not change.

Or, although it is not depicted, if a sleep mode is released, a screen is divided into a first area and a second area and intelligent start user interfaces are configured based on OSs different from each other and provided to the first area and the second area, respectively, in a specific operational mode at a specific angle. In this case, a convertible PC can be continuously controlled at a corresponding angle based on the intelligent start user interface operating based on an OS of a selected area according to a selection of a user. Meanwhile, since the convertible PC has a learning ability, if using frequency of a user using a specific OS is high at a predetermined angle, the convertible PC may preferentially provide an intelligent start user interface, which is configured based on the specific OS, to the user.

According to one embodiment of the present invention, the aforementioned method (flowchart) can be implemented with a code readable by a processor in a recording media in which a program is recorded. The examples of the recording media readable by the processor may include a ROM, a RAM, a CD-ROM, a magnetic tape, a floppy disc, an optical data storing device and the like. And, implementing in a form of a carrier wave (e.g., transmission via the internet) is also included.

The present invention may be non-limited to the aforementioned configurations and method of embodiments. The embodiments may be composed in a manner that a whole or a part of the each of the embodiments is selectively combined to achieve various modifications.

While the present invention has been described and illustrated herein with reference to the preferred embodiments and diagrams thereof, the present invention may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A method of controlling a convertible device including a first processing module and a second processing module, the method comprising:
   storing mode information for a plurality of operational modes of the convertible device, and first angle data;
   receiving an input for changing an angle different from an angle of the stored first angle data;
   detecting second angle data according to the received input; and
   outputting a predetermined user interface (UI) on an operational mode of the convertible device based on the first and second angle data and the stored mode information,
   wherein the first and second angle data is defined as an angle between the first processing module and the second processing module of the convertible device,
   wherein the convertible device operates in a first operational mode in a manner that the first processing module and the second processing module are overlapped with each other, and
   wherein when a predetermined button installed in one side of the second processing module is pushed, the first processing module is slid from the second processing module such that the convertible device operates in a second or a third operational mode.

2. The method of claim 1, wherein the first and second angle data is defined as an angle between the first processing module and the second processing module of the convertible device, and wherein the first and second angle data is any one of 0 degree, 45 degrees and 75 degrees.

3. The method of claim 2, wherein the first and second angle data is linked to the mode information of the convertible device, and
wherein the mode information includes a tablet mode and a laptop mode as the operational mode.

4. The method of claim 1, wherein the predetermined user interface contains one or more icons for one or more applications previously mapped according to the executed operational mode.

5. The method of claim 1, wherein the predetermined user interface contains icons for switching among operational modes.

6. The method of claim 5, wherein, if any icon among icons is selected, the convertible device outputs a predetermined user interface on an operational mode corresponding to the selected icon without any change of an angle of the convertible device.

7. The method of claim 1, wherein the predetermined user interface contains one or more recent pages which are used for a corresponding operational mode or all operational modes.

8. The method of claim 7, wherein each of the one or more pages consists of any one of a web page, a game execution page, a picture page, a video page, a search page and a broadcast program page.

9. The method of claim 4 further comprising:
detecting sensed data from a camera sensor or an eye-tracking sensor mounted in the convertible device, wherein the convertible device controls a screen to be automatically turned on or turned off based on the sensed data.

10. The method of claim 4, wherein, in a specific operational mode, the convertible device applies a battery-saving to the convertible device.

11. A convertible device comprising:
a first processing module and a second processing module,
at least one of the first processing module and the second processing module comprising:
a memory configured to store mode information for a plurality of operational modes of the convertible device, and to store first angle data defining a current angle between the first processing module and the second processing module of the convertible device;
a button configured to receive an input for changing the angle between the first processing module and the second processing module of the convertible device to an angle different from of the current angle defined by the stored first angle data;
a tilt sensor configured to detect second angle data according to the received input, said second angle data defining a changed angle between the first processing module and the second processing module of the convertible device;
a central processing unit (CPU) included in the first processing module, wherein the CPU is configured to identify an operational mode of the convertible device based on the changed angle defined by the second angle data and the stored mode information; and
a display unit configured to display a predetermined user interface on the identified operational mode of the convertible device,
wherein the convertible device operates in a first operational mode in a manner that the first processing module and the second processing module are overlapped with each other, and
wherein when the button installed in one side of the second processing module is pushed, the first processing module is slid from the second processing module such that the convertible device operates in a second or a third operational mode.

12. The convertible device of claim 11, wherein the first and second angle data is any one of 0 degree, 45 degrees and 75 degrees.

13. The convertible device of claim 12, wherein the first and second angle data is linked to the mode information of the convertible device, and
wherein the mode information includes a tablet mode and a laptop mode as the operational mode.

14. The convertible device of claim 11, wherein the CPU further controls to output the predetermined user interface containing one or more icons for one or more applications previously mapped according to the executed operational mode.

15. The convertible device of claim 11, wherein the predetermined user interface contains icons for switching among operational modes.

16. The convertible device of claim 15, wherein, if any icon among icons is selected, the CPU further controls to output the predetermined user interface on an operational mode corresponding to the selected icon without any change of an angle of the convertible device.

17. The convertible device of claim 14, wherein the predetermined user interface contains one or more recent pages which are used for a corresponding operational mode or all operational modes.

18. The convertible device of claim 17, wherein each of the one or more pages consists of any one of a web page, a game execution page, a picture page, a video page, a search page and a broadcast program page.

19. The convertible device of claim 14, further comprising:
a camera sensor or an eye-tracking sensor mounted in the convertible device that provides sensed data,
wherein the CPU is configured to control a screen to be automatically turned on or turned off based on the sensed data.

20. The convertible device of claim 14, wherein, in a specific operational mode, the CPU is configured to apply a battery-saving to the convertible device.

* * * * *